Sept. 22, 1936.  K. SCHLESINGER  2,054,882
RELAXATION OSCILLATION GENERATOR
Filed Sept. 16, 1933
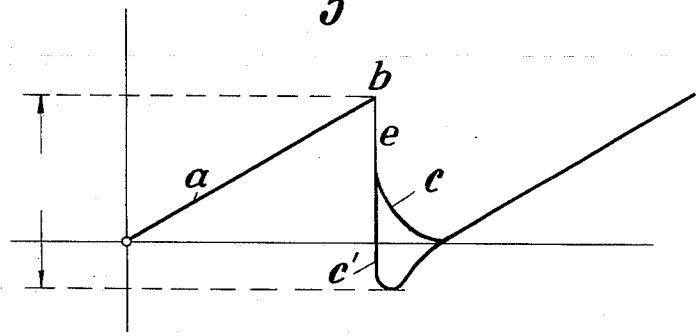
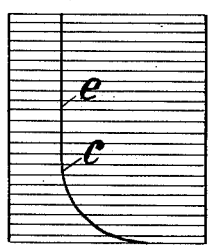
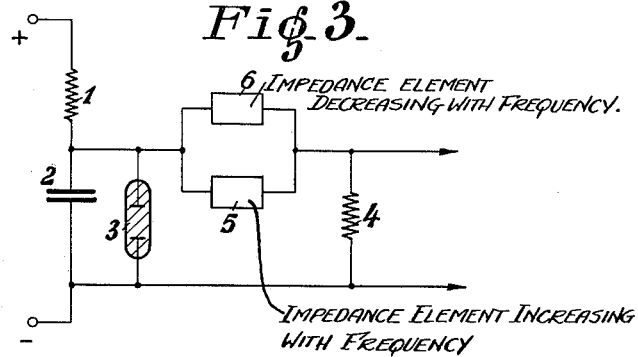
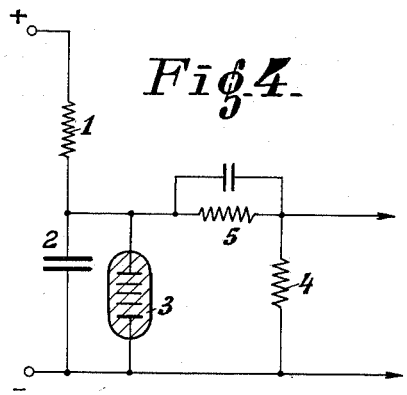
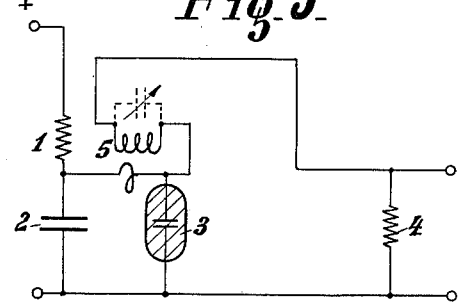
Inventor:
Kurt Schlesinger Patented Sept. 22, 1936

2,054,882

UNITED STATES PATENT OFFICE 2,054,882

RELAXATION OSCILLATION GENERATOR

Kurt Schlesinger, Berlin, Germany

Application September 16, 1933, Serial No. 689,758
In Germany September 24, 1932

5 Claims. (Cl. 250—36)

When used for scanning in television the relaxation oscillation circuits hitherto known have the disadvantage that a part of the return line is clearly visible on the screen, and accordingly interferes with the effect of the image. It is particularly inconvenient that the visible portion of the return line affects the image the more the lower the potential of the relaxation oscillations, which, with a view to safety in operation and durability, should be as low as possible.

The subject matter of the invention is a circuit system, which enables the visible portion of the discharge curve to be expelled from the field of image, so that in the latter, there remains merely the practically invisible hair line $e$ of the curve.

The invention will be best understood with reference to the accompanying drawing, of which in Fig. 1 there is shown a relaxation potential time curve. Fig. 2 shows the area of the screen to be scanned line by line, while in Figs. 3 to 5 there are illustrated exemplary connection systems according to the invention.

In Fig. 1 there is shown a potential-time curve of a relaxation oscillation generator, the form of which curve is typical for practically all relaxation oscillation generators with discharge valves, the current of which is dependent on the height of the potential applied. $a$ is the ascending branch of the curve, and $b$ the ignition point. At $b$ the discharge is initiated in sudden fashion with large current intensity and the curve falls precipitously at an angle to the charging curve. The run of the discharge is represented by the branch $c$. The same discloses towards the end of the discharge a greatly diminished rate of discharge. This effect is mostly caused by the potential dependency of the discharge current intensity, but also take place, for example in connection with arc discharges, owing to recombination sluggishness of the arc ions. Now whereas the upper part of the discharge curve $e$ hardly produces a visible effect on the screen, the lower part $c$, owing to the reduced rate of movement of the image point, can be seen quite clearly. A television scanning of this nature with the disturbing return line portion $c$ is illustrated in Fig. 2.

This figure shows as an example the scanned area of an image the scanning beginning at the lower right corner and ending at the upper left corner.

According to the invention there is provided between generator and consuming apparatus a transmission element, the reactance of which in respect to the high frequency occurring in pronounced fashion at the ignition point $b$ of the charging curve (Fig. 1) (which frequency is approximately one hundred times greater than the charging frequency) is less than its reactance for the charging frequency. In this manner the invisible part $e$ of the discharge curve passes across, and out of, the field of the image and the disturbing visible portion $c'$ is eliminated from the image. This part of the return line—now situated outside of the image—may be screened off without difficulty by the use of a suitable diaphragm, without screening off parts of the image itself. Naturally in place of one transmission element it is also possible to employ different elements, of which one possesses a less reactance for the high frequency.

A general diagram illustrating an embodiment of this nature is shown by way of example in Fig. 3. In the same 1 is the charging resistance, 2 the condenser for producing the relaxation oscillations, and 3 the glow lamp. Between the relaxation oscillation generator and the consuming apparatus 4 there are provided two transmission elements 5 and 6, of which one possesses a greater conductance for the high frequency than for the charging frequency, whilst in respect of the second element the position may be reversed.

The element 5 is such that its impedance decreases as the frequency applied across it is increased and the element 6 has an opposite impedance frequency characteristic.

A simple form of embodiment of the arrangement according to the invention is shown by way of example in Fig. 4.

The oscillation circuit is illustrated by the elements 1, 2 and 3. The two frequency-dependent transmission elements, which are connected in parallel, comprise a highly ohmic resistance 5 of approximately .5 megohm and a small condenser 6 of approximately $1.1 \times 10^{-4} \mu F$. There then results in point of fact the form of curve according to Fig. 1, since as regards the low frequencies there takes place a distribution of potential in the ratio of the two ohmic resistances 4 and 5, whilst as regards the high-frequency components of the ignition phase a potential distribution of this nature is eliminated by the condenser 6. The further course of the discharge curve is determined by the discharge of the small condenser 6 over the resistances 4 and 5. The discharge occurs aperiodically, has approximately the form shown in Fig. 1 ($b$—$e$—$c'$), and may be regulated as desired by suitable selection of the time constants of 5, 6 and 4. In particular, it is possible to make the lower bend of the discharge curve coincide with the lower edge of the image.

An additional form of embodiment of the invention is illustrated in Fig. 5. In this arrangement the transmission element is so formed that the transmission of voltage from the relaxation oscillation generator to the consuming apparatus 4 is not stepped up in respect of low frequency, but is stepped up in respect of high frequency. This may be accomplished in practice by a high-frequency transformer 5, in case the resistance of the consuming apparatus 4 is greater than the resistance in the discharge circuit 2, 5, 3. The high-frequency component then passes over with an increase in potential over the high-frequency transformer 5, the secondary of which is broadly tuned in the high-frequency band to be transferred to the consumer. The form of the discharge curve differs only to a little extent from that shown in Fig. 1. The same may be oscillatory, or may also be changed into an aperiodic form without difficulty, for example for means of damping resistances.

Naturally the arrangements according to Figs. 4 and 5 represent merely possible forms of embodiment. It is quite readily possible, employing the master diagram according to Fig. 3, to set forth other equivalent circuits.

It is essential as regards the invention, whilst employing the high frequency portion of the sharp upper bend of the discharge curve, to ensure that the lower rounded bend of the discharge curve is eliminated from the image. The most simple means for accomplishing this object resides in the use of potential distributors between generator and consuming apparatus, which transmit the high frequency components of the upper bend to a better extent than all low frequencies.

I claim:

1. A generator producing relaxation oscillations comprising a unidirectional source of potential, a charging condenser, a charging resistance in series and a glow discharge device across said charging condenser, output terminals for said generator, means connected between one terminal of said charging condenser and one output terminal, said means having less reactance with respect to the high frequency components of said relaxation oscillations than for the low frequency components, the other output terminal being connected to the other terminal of said charging condenser.

2. A generator for producing relaxation oscillations comprising a unidirectional source of potential, a charging condenser, a charging resistance in series and a glow discharge device across said charging condenser, output terminal for said generator, a filter connection comprising a low frequency pass filter and a high frequency pass filter connected in parallel to each other, said filter connection being connected between one terminal of said charging condenser and one output terminal, and having less reactance with respect to the high frequency components of said relaxation oscillations than for the low frequency components, the other output terminal being connected to the other terminal of said charging condenser.

3. A generator for producing relaxation oscillations comprising a unidirectional source of potential, a charging condenser, a charging resistance in series and a glow discharge device across said charging condenser, output terminals for said generator, a resistance and a second condenser of substantially $1.1 \times 10^{-4}$ $\mu$F in parallel connected between one terminal of said charging condenser and one output terminal, said means having less reactance with respect to the high frequency components of said relaxation oscillations than for the low frequency components, the other output terminal being connected to the other terminal of said charging condenser.

4. A generator for producing relaxation oscillations comprising a unidirectional source of potential, a charging condenser, a charging resistance in series and a glow discharge device across said charging condenser, output terminals for said generator, a high frequency transformer connected between one terminal of said charging condenser and one output terminal, the primary winding of said transformer being connected in series with said secondary winding, to the ends of said windings connected with each other being connected to the one electrode of said glow discharge tube, the other electrode of said glow discharge device and the other output terminal being connected to the other terminal of said charging condenser, said primary winding of said transformer being so dimensioned with respect to said secondary winding as to cause less reactance with respect to the high frequency components of said relaxation oscillations than for the low frequency components.

5. A generator for producing relaxation oscillations comprising a unidirectional source of potential, a charging condenser, a charging resistance in series and a glow discharge device across said charging condenser, output terminals for said generator, a high frequency transformer connected between one terminal of said charging condenser and one output terminal, the primary winding of said transformer being connected in series with said secondary winding, to the ends of said windings connected with each other being connected to the one electrode of said glow discharge tube, the other electrode of said glow discharge device and the other output terminal being connected to the other terminal of said charging condenser, said primary winding of said transformer being so dimensioned with respect to said secondary winding as to cause less reactance with respect to the high frequency components of said relaxation oscillations than for the low frequency components, said secondary winding being broadly tuned in the high frequency components' band by its natural capacities.

KURT SCHLESINGER.